Nov. 10, 1970     M. BOUCRAUT ET AL     3,539,293
METHOD FOR TREATING A FLUIDIZED BED OF PULVERULENT
MATERIAL WITH HOT COMBUSTION GASES
Filed Nov. 22, 1966     3 Sheets-Sheet 1

3,539,293
METHOD FOR TREATING A FLUIDIZED BED OF PULVERULENT MATERIAL WITH HOT COMBUSTION GASES
Michel Boucraut, Metz, and Imre Toth, Hy-Metz, France, assignors to Institut de Recherches de la Siderurgie Francaise, Saint Germain-en-Laye, Yvelines, France
Filed Nov. 22, 1966, Ser. No. 596,276
Claims priority, application France, Nov. 24, 1965, 39,541
Int. Cl. C01g *49/08*
U.S. Cl. 23—200                                                 4 Claims

ABSTRACT OF THE DISCLOSURE

A method of treating a fluidized bed of pulverulent material with hot combustion gases. This method comprises the steps of feeding a combustible material and a combustion sustaining agent in upward direction under a fluidized bed of pulverulent material with a speed greater than the speed of propagation of combustion of the combustible material, intimately mixing the combustible material and the combustion sustaining agent during the feeding thereof toward the bed, and reducing the speed of the mixture to a speed at most equal to the speed of propagation of combustion to maintain the bed of pulverulent material in fluidized condition and to cause combustion of the mixture within the fluidized bed.

---

The present invention relates to a method for treating a fluidized bed of pulverulent material with hot combustion gases.

A method of treating ferrous minerals in form of a fluidized bed is known in which combustion air is introduced at the bottom of the fluidizing apparatus by means of a grate in order to cause combustion of hydrocarbons directly injected into the fluidized bed. With this process the pressure drop of the air passing through the grate or grates cannot be modified, which entails the serious risk of clogging the grates by the minerals.

In addition, the hydrocarbons directly injected into the fluidized bed are at least momentarily in direct contact with the particles forming the fluidized bed and this may result in enveloping the particles with unburned hydrocarbons in form of a layer of carbon black which will make further treatment of the particles difficult. Finally, the unburned hydrocarbons may also clog the fluidizing apparatus and cause disturbances in the treatment of the fluidized product.

It is an object of the present invention to provide for a method of treating a fluidized bed of pulverulent material with hot combustion gases which avoids the difficulties encountered with processes of this type known in the art.

With these objects in view, the method of treating a fluidized bed of pulverulent material with hot combustion gases mainly comprises the steps of feeding combustible material and a combustion sustaining agent in upward direction under a fluidized bed of pulverulent material with a speed greater than the speed of propagation of combustion of the combustible material, intimately mixing the combustible material and the combustion sustaining agent during the feeding thereof towards the bed, and reducing the speed of the mixture in the bed to a speed at most equal to the propagation of combustion, to maintain the bed of pulverulent material in fluidized condition and to cause combustion of the mixture within the fluidized bed.

The method according to the present invention may also include the following characteristics combined with the characteristics set forth above:

(a) The intimate mixture of the combustible material and the combustion sustaining agent may be obtained by imparting to the latter a gyratory motion.

(b) The reduction of the speed of the mixture may be obtained by passing the mixture through a passage which gradually increases in cross section.

(c) The pulverulent material from which the fluidized bed is formed may be a ferrous material composed essentially of hematite ($Fe_2O_3$) which is reduced by the combustion gas to magnetite ($Fe_3O_4$).

Basically the invention consists in treating pulverulent material in a reaction chamber in which the pulverulent material is fluidized by a mixture which is ignited in the fluidized bed of the pulverulent material.

The novel features of the present invention reside in the fact that combustible material and combustion sustaining material is introduced into a reaction chamber beneath the fluidized bed therein in such a manner that the mixture of the combustible material and the combusting sustaining material are introduced into the reaction chamber at a speed superior to the speed of propagation of combustion of the mixture and that the ignition of the mixture in the fluidized bed is obtained by reducing the aforementioned speed until it reaches a speed substantially equal to the speed of propagation of combustion of the mixture.

An advantage of the method of the present invention is that an intimate mixture of the combustible material and the combustion sustaining agent is obtained before the mixture is ignited. Due to this intimate mixing the oxygen contained in the mixture will react with the entirety of the combustible material so that formation of carbon black is avoided even in the case in which the final combustion product is essentially carbon oxide (CO).

As pointed out above, the mixture will become ignited only after the speed of the mixture becomes substantially equal to the speed of propagation of combustion of this mixture. According to one feature of the present invention, the speed of the gaseous mixture is reduced by passing the mixture through a passage with a gradually increasing cross section. According to the invention this result is obtained in an upwardly diverging passage which may be constituted by a frustoconical surface. On the other hand, the speed of the mixture is maintained large enough to maintain the pulverulent material in fluidized condition and to prevent the pulverulent material to drop to the bottom of the divergent passage. This will result that during the treating process the bottom part of the aforementioned passage will be free from pulverulent material so that clogging of the passage is avoided. Another advantage of the present invention resides in the fact that fluidizing grates as are necessary in similar processes according to the prior art are unnecessary in carrying out the present invention.

In fact, the fluidized material floats in the reaction chamber in a zone in which the speed of the ignited gas is sufficient in order to maintain the pulverulent material in fluidized state. This combustion will take place in its entirety in the midst of the fluidized bed, the lower limit of which may be located in the upper part of the divergent portion of the passage through which the combustible material and the combustion sustaining agent is introduced into the reaction chamber. However, the fluidized bed will essentially be located in a zone which forms a continuation of the divergent passage. This zone will have at least a lower portion which is slightly divergent, which permits to reduce the speed of the enflamed gas further to avoid in this way an upwards entrainment of the pulverulent material so as to arrive at a very stable fluidized bed of pulverulent material.

It is in this way that contact between the combustion gas and the pulverulent material forming the fluidized bed will be obtained which will assure the desired chemical and physical treatment of the pulverulent material. The used up combustion gas is discharged from an upper portion of the reaction chamber in a manner known per se, and the pulverulent material is introduced in the chamber and discharged after treatment therefrom likewise by means known in the art.

Another advantage of the present invention lies in the possibility of varying the pressure drop of the combustion sustaining agent introduced into the reaction chamber even if the rate of flow of this agent is held constant. This permits to modify the distribution of the mixture in the divergent portion of the passage and to adapt this distribution to characteristics of the pulverulent material used in order to obtain in the case a plurality of injectors are used a perfect stabilization of the fluidized bed. This may be obtained by placing a movable valve at the bottom of the passage through which the combustible material and the combustion sustaining agent is introduced into the reaction chamber to thus form with the inlet opening with the passage a variable cross section.

The valve body may be formed on a surface thereof facing a valve seat provided at the inlet opening of the aforementioned passage with a plurality of grooves arranged in such a manner to impart to the gas passing between the aforementioned surface of the valve member and the valve seat a gyratory motion which will facilitate and accelerate an intimate mixture of the combustion air with the combustible material. The combustible material may be gaseous or a liquid. If a liquid is used for the combustible material, this liquid is preferably atomized by means of a compressed gas. It is also possible to impart to the thus atomized liquid a gyratory or helicoidal motion in order to enhance the mixture thereof with the combustion sustaining agent.

It sometimes happens that the combustion gas forms in the fluidized bed large gas bubbles which do not contain any pulverized material, which will result in a reduction of contact surface between gas and pulverized material. In order to avoid such a reduction of contact, the present invention includes also the provision of a grate which may be formed of metal, and be arranged transversely through the zone in which the fluidized bed of pulverulent material is maintained and which serves to break up any gas bubbles forming in this zone to reestablish again normal contact between the combustion gas and the fluidized particles. This grate may advantageously be formed from nickel, which under certain circumstances may serve as a catalyser, but this grate, which does not serve at all to produce fluidization, has only the auxiliary purpose above mentioned and is not absolutely necessary for carrying out the present invention.

It is to be understood that the reaction chamber means according to the present invention may be provided with a plurality of injector means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is drawn to a larger scale than FIG. 1 and shows various construction features in further detail.

Figure 1:
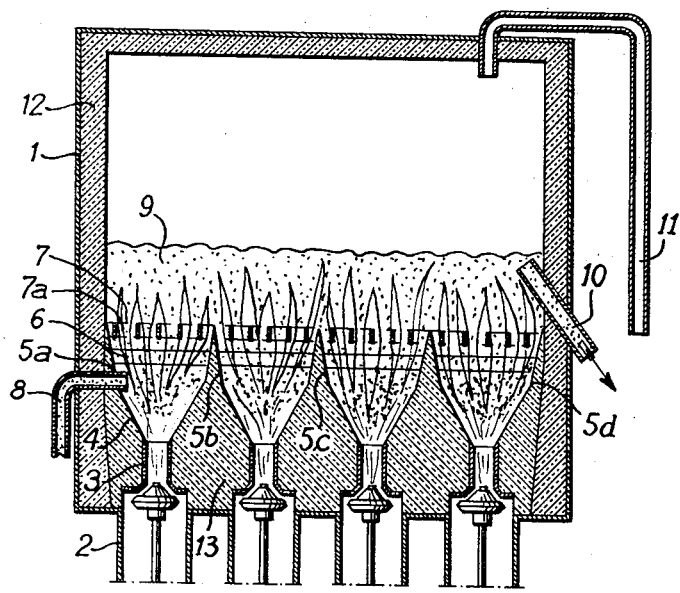
FIG. 1 is a schematic cross section through an apparatus according to the present invention.

FIG. 1 schematically illustrates an apparatus for carrying out the method of the present invention. The apparatus illustrated in FIG. 1 is especially used to fluidize pulverulent ferrous material and to subject the fluidized bed to a roasting process that is to a partial reduction of $Fe_2O_3$ into $Fe_3O_4$.

The apparatus illustrated in FIG. 1 includes a reaction chamber 1 in which a fluidized bed of pulverulent material is maintained by injecting through the bottom of the reaction chamber a mixture of preheated air and atomized fuel oil by means of four injectors 2. The injectors 2 are identical in construction and one of which is illustrated in further details in FIG. 2. The gaseous mixture enters into the bottom of the reaction chamber through passage means having a lower portion 3 of substantially uniform, preferably circular, cross section and an upwardly diverging portion 4, preferably in the form of a frustoconical surface of a cone angle of substantially 60 degrees, in which ignition of the gaseous mixture introduced thereinto starts. The ignition and the combustion of the mixture takes place in the frustoconical portions 5a, 5b, 5c and 5d, above which bubble breaking grates 6 and 7 are located. The pulverulent material is introduced into the frustoconical portion 5a by means of a conduit 8, and the pulverulent material is fluidized by means of the combustion gas so as to form a fluidized bed 9 of pulverulent material. The treated mineral is discharged from the interior of the reaction chamber 1 by means of a conduit 10 whereas the used combustion gas is discharged through a conduit 11, communicating with an upper portion of the reduction chamber 1. The reduction chamber 1 is lined at the inner surface by bricks 12 of refractory material, whereas the bottom of the reaction chamber is formed by insulating bricks 13 from diatomite.

Figure 2:
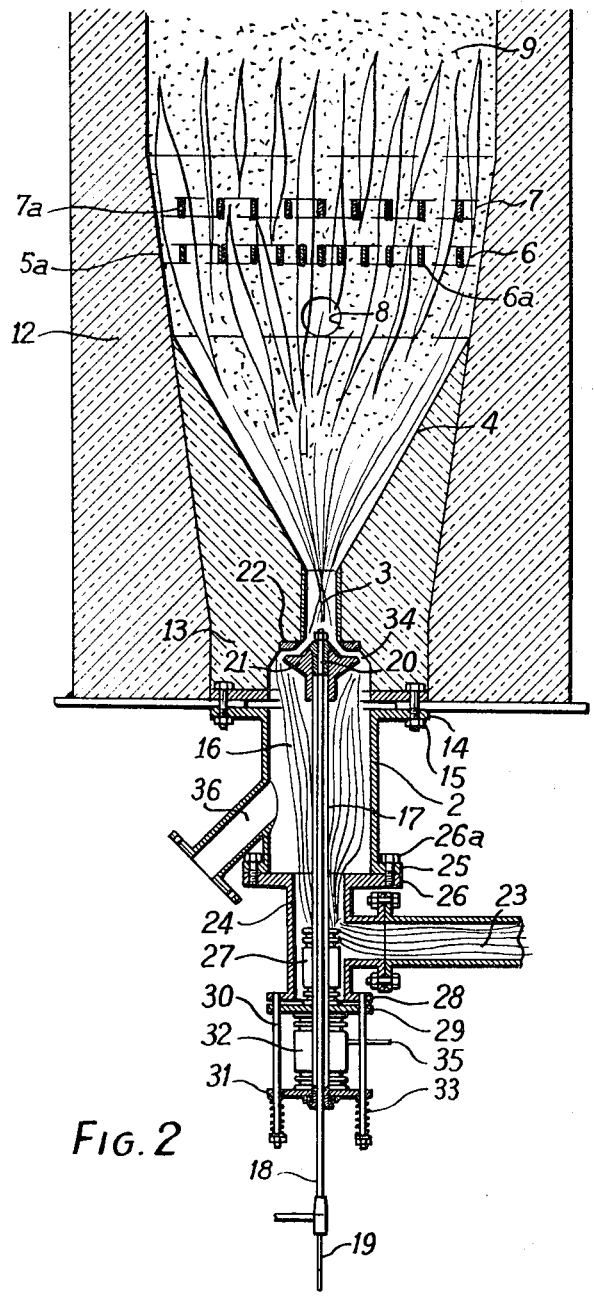
FIG. 2 is a cross-section taken along a plane normal to the plane along which the cross-section shown in FIG. 1 is taken.

The cross section of FIG. 2, which is taken in a plane normal to the plane and at which the cross section of FIG. 1 is taken, illustrates at an enlarged scale further details of the apparatus of the present invention. Elements already described in FIG. 1 are designated in FIG. 2 with the same reference numerals.

As can be seen from FIG. 2, the injector 2 is fixed to a bottom plate of the reaction chamber 1 by means of a clamp 14 and screw bolts 15. The injector 2 comprises a tubular member 16, guide tube 17 coaxially arranged in the tubular member 16, and conduits 19 and 18 coaxially arranged in the guide tube 17 and respectively connected at the lower ends thereof to a source of fuel oil and a source of compressed air, not illustrated in the drawing. The fuel oil passing through the tube 19 is atomized by means of the compressed air passing through the conduit 18 in a nozzle or atomizer 20 of standard construction, connected to the upper ends of the conduits 18 and 19 and located in a central bore of a valve body 21, connected to the upper end of the guide tube 17 and arranged in the upper end of the tubular member 16 to cooperate with a valve seat 22 provided at the upper end of the tubular member 16. Combustion air is supplied to the interior of the tubular member 16, by means of a conduit 23, and a tube 24 having at the upper end thereof a flange 26 fixed to a flange 25 at the lower end of the tubular member 16 by means of screw bolts 26a. Bellows 27 surrounding a portion of the guide tube 17 located in the conduit 24 are fixed at the lower end to a plate 29 closing the bottom end of the tube 24, and being fixed to the flange 28 integral with the bottom end of the tube 24, so that the bellows 27 provides a seal preventing escape of air in downward direction through the opening in the plate 29 through which the guide tube 17 passes with clearance. An additional bellows 32 is provided between the plate 29 and an additional plate 31 connected at a central portion thereof to the bottom end of the guide tube 17 and being slideably guided for movement in substantially vertical direction on guide pins 30 fixed at the upper ends thereof to the plate 29 and/or the flange 28. The guide rods 30 extend downwardly beyond the plate 31 and compression springs 33 are arranged about the portions of the guide rods 30 projecting downwardly beyond the plate 31, abutting with the lower ends thereof against nuts fixed to the bottom ends of the guide pins 30 and with the upper ends thereof against the bottom surface of the plate 31, so as to urge the latter in upward direction. A conduit 35 communicates with the interior of the bellows 32 for feeding into the latter compressed air from a source not shown in the drawing. By feeding compressed air into the bellows 32, the latter is expanded against the force of the compression springs 33, so that the guide tube 17 and the valve member 21 connected thereto are moved in downward direction to increase the passage 34 between the upper face of the valve member 21 and the valve seat 22, whereas when air is discharged from the bellows 32, the compression springs 33 will move the guide tube 17 and the valve member 21 connected thereto in upward direction to reduce thereby the cross section of the passage 34.

A downwardly directed branch tube 36 communicates with the tubular member 16 for discharging at the beginning of the operation pulverulent material, which may have accumulated in the tubular member 16, therefrom. During normal operation the outer end of the branch tube 36 is closed.

FIG. 2 illustrates also the grates 6 and 7 in further detail. The grate 6 comprises a plurality of bars 6a parallel to the sides of the grate and arranged in such a manner that the distance between adjacent bars diminishes from the outside of the grate toward the center thereof. The grate 7 is formed by bars 7a arranged parallel to the diagonal of this grate and spaced uniformly from each other.

Figure 3:
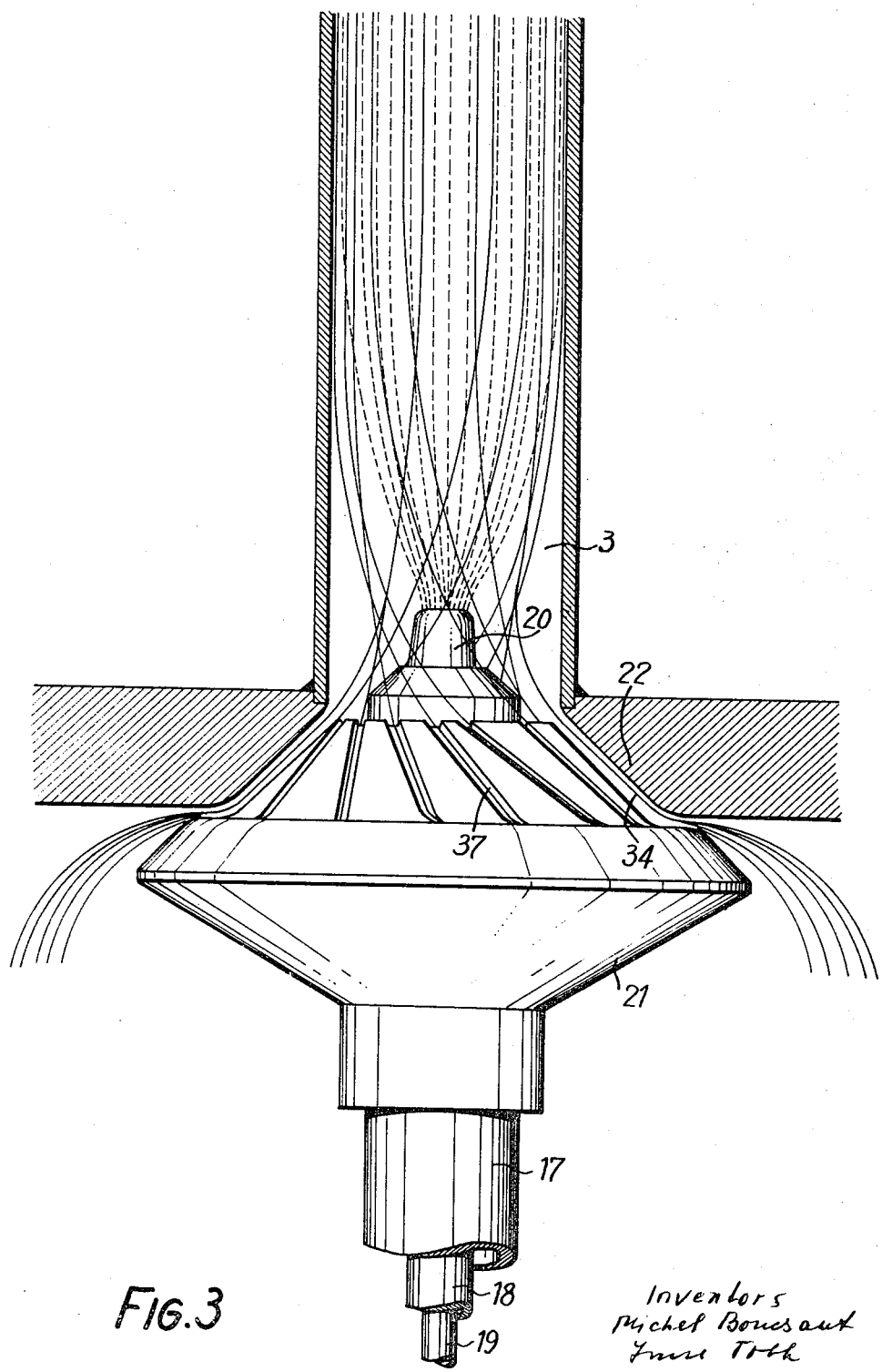
FIG. 3 is a further enlarged partial cross-sectional view and showing a detail of the apparatus illustrated in FIGS. 1 and 2.

FIG. 3 illustrates the upper portion of an injector tube at an enlarged scale and in further detail. The upper surface of the valve member 21 forms with the valve seat 22 an annular passage 34 and secondary combustion air will pass from the tubular member 16 into the passage portion 3 through the annular passage 34 and through grooves 37 formed in the upper surface of the valve member 21 arranged inclined or askew to the axis of the valve member 21 in such a manner so as to impart to the combustion air passing therethrough a gyratory motion which will improve mixing of combustion air with the combustible material. The mixing is further improved by atomizing the fuel oil by means of compressed primary air in the atomizer 20 and for this purpose an atomizer of known type may be used which includes in the interior of its base helicoidal grooves which produce an excellent atomizing and at the same time a gyratory motion of the atomized fuel oil. For reason of simplification the specific construction of the atomizer is not illustrated in detail in the drawing.

The above described apparatus will operate as follows: Before beginning of the operation, the interior of the reaction chamber 1 is heated by means of an exterior burner not shown in the drawing, which may for instance be a gas burner, to a temperature in the region of 500° C. When this temperature is reached in the interior of the reaction chamber 1 the injectors 2 are started so as to form flames in the interior of the reaction chamber the height of which is adjusted by adjusting the annular discharge passages 34 by moving the valve members 21 relative to the valve seats 22. Subsequently thereto, the pulverized mineral is fed into the reaction chamber by the conduit 8 and the pulverulent material is fluidized and treated by the gas burning in the fluidized bed 9. The used combustion gas escapes through the conduit 11 and the treated mineral is discharged by the conduit 10.

In summarizing it is pointed out that the present invention will provide various advantages, that is the omission of fluidizing grates which tend to cause clogging, the possibility to modify the mixture of combustible material and a combustion sustaining agent in any desired manner, and the possibility to use combustion gas having a high reduction characteristic without risking the formation of carbon blacks. Furthermore, the apparatus according to the present invention is of extremely simple construction to assure thereby trouble-free and perfect operation during extended use.

It will be understood that each of the elements described above, or two or more together, may also find a useful application in other types of apparatus for treating a fluidized bed of pulverulent material differing from the types described above.

While the invention has been illustrated and described as embodied in an apparatus for treating a fluidized bed of pulverulent ferrous material with hot combustion gases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of treating a fluidized bed of pulverulent iron oxide-containing material with hot combustion gases, comprising the steps of feeding through the lower portion of a passage a fluid combustible material and a gaseous combustion sustaining agent containing free oxygen in upward direction with a speed greater than the speed of propagation of combustion of said combustible material; intimately mixing said combustible material and said combustion sustaining agent during said feeding thereof in upward direction through said lower portion of said passage; and then feeding the thus obtained mixture in upward direction through an upwardly diverging portion of said passage directly following said lower portion of said passage and located directly under said fluidized bed, said feeding through said upwardly diverging portion of said passage being carried out at a speed at most equal to said speed of propagation of combustion, whereby in said lower portion of said passage an intimate mixture of said fluid combustible material and said combustion sustaining agent and in said upwardly diverging portion of said passage ignition of said intimate mixture and thereafter combustion thereof within said fluidized bed is obtained.

2. A method as defined in claim 1, wherein said intimate mixing of said combustible material and said combustion sustaining agent is produced by imparting to the latter a gyratory motion.

3. A method as defined in claim 1, wherein said combustible material comprises fuel oil and said combustion sustaining agent combustion air, and wherein said intimate mixing is obtained by producing a stream of atomized fuel oil and by directing a stream of combustion air about the stream of atomized fuel oil while imparting a gyratory motion to said stream of combustion air.

4. A method as defined in claim 1, wherein said pulverulent material is composed essentially of hematite ($Fe_2O_3$) which is reduced by the combustion gas to magnetite ($Fe_3O_4$).

References Cited
UNITED STATES PATENTS

| | | |
|---|---|---|
| 2,404,944 | 7/1946 | Brassert. |
| 2,596,954 | 5/1952 | Heath _____ 23—200 |
| 2,856,264 | 10/1958 | Dunn. |
| 3,236,607 | 2/1966 | Porter et al. _____ 23—284 |

OSCAR R. VERTIZ, Primary Examiner

G. T. OZAKI, Assistant Examiner

U.S. Cl. X.R.

23—1, 284; 34—10